United States Patent
Desai (10) Patent No.: US 12,269,716 B2
(45) Date of Patent: Apr. 8, 2025

(54) COUPLING FOR A ROPE DRUM OF A LIFTING DEVICE

(71) Applicant: Konecranes Global Corporation, Hyvinkaa (FI)

(72) Inventor: Deepak Madhusoodan Desai, District Pune (IN)

(73) Assignee: Konecranes Global Corporation, Hyvinkää (FI)

( * ) Notice: Subject to any disclaimer, the term of this patent is extended or adjusted under 35 U.S.C. 154(b) by 805 days.

(21) Appl. No.: 17/310,848

(22) PCT Filed: Feb. 28, 2020

(86) PCT No.: PCT/EP2020/055340
§ 371 (c)(1),
(2) Date: Aug. 26, 2021

(87) PCT Pub. No.: WO2020/178194
PCT Pub. Date: Sep. 10, 2020

(65) Prior Publication Data
US 2022/0144604 A1    May 12, 2022

(30) Foreign Application Priority Data
Mar. 1, 2019 (FI) ..................................... 20195154

(51) Int. Cl.
*B66D 1/14* (2006.01)
*B66D 1/30* (2006.01)
*F16D 3/18* (2006.01)

(52) U.S. Cl.
CPC .............. *B66D 1/14* (2013.01); *F16D 3/185* (2013.01); *B66D 1/30* (2013.01)

(58) Field of Classification Search
CPC ........ B60B 27/0026; B66D 1/14; B66D 1/30; F16D 3/185
(Continued)

(56) References Cited

U.S. PATENT DOCUMENTS 1,770,744 A * 7/1930 Morgan ................... F16D 3/185
464/158
3,142,972 A * 8/1964 Spaulding, Jr. ......... F16D 3/185
464/159
(Continued)

FOREIGN PATENT DOCUMENTS

CN        202186855 U     4/2012
CN        203348359 U    12/2013
(Continued)

*Primary Examiner* — Josh Skroupa
(74) *Attorney, Agent, or Firm* — Gardner, Linn, Burkhart & Ondersma LLP (57) ABSTRACT

A coupling for a connection between a gear box and a rope drum of a lifting device, wherein the coupling comprises an inner coupling support element and an outer coupling support element, wherein the inner coupling support element and the outer coupling support element are configured to rotate around a mutual axis of rotation, wherein the coupling is configured to allow a swiveling of the inner coupling support element and/or the outer coupling support element from the mutual axis of rotation. To improve the coupling, the coupling further comprises a gearing and a bearing with the gearing being configured to transmit rotation and torque from the gear box to the rope drum and the bearing being configured to transmit radial and axial forces from the rope drum to the gear box.

17 Claims, 5 Drawing Sheets

(58) Field of Classification Search
USPC .................................. 464/158, 159
See application file for complete search history.

(56) References Cited

U.S. PATENT DOCUMENTS

| | | | | |
|---|---|---|---|---|
| 3,427,825 | A * | 2/1969 | Willy | F16D 3/185 |
| | | | | 464/159 |
| 3,775,997 | A * | 12/1973 | Carman | F16D 3/185 |
| | | | | 464/159 |
| 4,909,773 | A * | 3/1990 | Schlecher | F16D 3/185 |
| | | | | 464/159 |
| 5,152,263 | A | 10/1992 | Danieli | |
| 5,911,630 | A | 6/1999 | Shigeura | |
| 6,196,922 | B1 * | 3/2001 | Hantschk | F16D 3/185 |
| | | | | 464/159 |
| 6,506,120 | B1 | 1/2003 | Lockwood | |
| 8,246,477 | B2 * | 8/2012 | Downey | F16D 3/185 |
| | | | | 464/151 |
| 8,960,689 | B1 | 2/2015 | Williams | |
| 2007/0286544 | A1 | 12/2007 | Andy | |
| 2011/0230305 | A1 | 9/2011 | Miyawaki et al. | |

FOREIGN PATENT DOCUMENTS

| | | | | |
|---|---|---|---|---|
| CN | 203807025 U | | 9/2014 | |
| CN | 104828727 A | | 8/2015 | |
| CN | 106564825 A | | 4/2017 | |
| CN | 107654517 A | | 2/2018 | |
| DE | 1653874 A1 * | | 4/1970 | F16D 3/185 |
| DE | 2648118 A1 | | 4/1978 | |
| DE | 3007319 A1 | | 9/1981 | |
| DE | 102016115017 A1 | | 2/2018 | |
| DE | 202017101823 U1 | | 7/2018 | |
| GB | 795225 A | | 5/1958 | |
| SU | 941733 A1 * | | 7/1982 | F16D 3/185 |

* cited by examiner

COUPLING FOR A ROPE DRUM OF A LIFTING DEVICE

FIELD OF THE INVENTION

The present invention relates to a coupling according to the claims and a lifting device according to the claims.

BACKGROUND TO THE INVENTION

The document DE 20 2017 101 823 U1 discloses a barrel coupling. This type of coupling has the disadvantage that the contact areas between the barrel and the support components are very small and, therefore, have to cope with high stress levels. This solution is expensive, also in view of replacements due to wear.

The document DE 26 48 118 A1 discloses a slowly rotating sleeve bearing for heavy duty machinery, which is not intended to be used for a rope drum.

The document GB 795 225 A discloses a coupling comprising a bearing and a gearing, which allows swiveling of an inner coupling part or an outer coupling part from the mutual axis of rotation. The coupling is not intended to be used in a lifting device.

Further general prior art documents related to couplings and bearings are US 2007/286544 A1, U.S. Pat. No. 6,506,120 B1, CN 202 186 855 U, U.S. Pat. No. 8,960,689 B1, and DE 30 07 319 A1.

PURPOSE OF THE INVENTION

In view of the above, the object of the invention is to improve a coupling for a connection between a gear box and a rope drum of a lifting device in such a way, that it is more robust and its dimensions are still compact.

DESCRIPTION OF THE INVENTION

This object is achieved by a coupling comprising the features of the claims and a lifting device comprising the features of the claims. The dependent claims as well as the following specification describe advantageous embodiments of the invention.

The invention relates to a coupling for a connection between a gear box and a rope drum of a lifting device, in particular a hoist or a rope hoist that can be used alone or for a crane mounted on a movable crane trolley. However, other applications for the coupling, for instance at a winch conveyor or a platform hoist, are also possible.

The coupling comprises an inner coupling support element and an outer coupling support element, wherein the inner coupling support element and the outer coupling support element are configured to rotate around a mutual axis of rotation.

The coupling is also configured to allow a swiveling of the inner coupling support element and/or the outer coupling support element from the mutual axis of rotation.

According to the invention such a coupling is improved in that it further comprises a gearing and a bearing with the gearing being configured to transmit rotation and torque from the gear box to the rope drum and the bearing being configured to transmit radial and axial forces from the rope drum to the gear box, wherein both the gearing and the bearing each comprises an external and an internal part.

According to the invention such a coupling is also improved in that way that the external part of the gearing is integral part of the outer coupling support element or seated in the outer coupling support element, and the external part of the bearing is integral part of the outer coupling support element or seated in the outer coupling support element, and the internal part of the gearing is integral part of the inner coupling support element or seated on the inner coupling support element, and the internal part of the bearing is integral part of the inner coupling support element or seated on the inner coupling support element.

In other words, the invention foresees that the external part of the gearing and the external part of the bearing are integral part of or seated in the same structural element of the coupling, namely the outer coupling support element. Furthermore, the invention foresees that the internal part of the gearing and the internal part of the bearing are integral part of or seated on the same structural element of the coupling, namely the outer coupling support element.

A major benefit of this configuration of the coupling is the compact dimensions of the coupling while being able to provide large swiveling angles, hence misalignment between the axis of rotation of the inner coupling support element and the axis of rotation of the outer coupling support element. For instance, swiveling can occur due to uneven load distribution at the rope drum, e.g. when the rope is partially unrolled. Other reasons for misalignment and/or swiveling can be assembly inaccuracies, flexing or bending of the gearbox or the supporting structures, which can induce horizontal/axial forces, movements and also thermal expansion. As with the solution according to the invention large swiveling angles can be achieved, the degree of freedom at the rope drum design is extended. Additionally, the number of parts can be reduced with this configuration according to the invention.

Another benefit of the invention is the decoupling of the transmission functions, namely the transmission of rotation and torque and the transmission of radial and axial forces. Hereby, the stress introduction can be separated to different and suitable machine elements, namely the bearing and the gearing, and therefore the wear can be reduced.

It may be advantageously provided that the inner coupling support element is configured as an auxiliary hub, which is preferably formed to be seated on a shaft, and/or the outer coupling support element is configured as an auxiliary hub, which is preferably formed to be seated in a base hub that is preferably designed as an end flange of the rope drum.

In a preferred embodiment, the external part of the gearing is integral part of such an auxiliary hub, which is formed to be seated in an input hub of a rope drum that is formed by one of its end flanges, and the external part of the bearing is formed to be seated in this auxiliary hub. Moreover, in a preferred embodiment, the internal part of the gearing is integral part of such an auxiliary hub, which is formed to be seated on an output shaft of a gear box, and the internal part of the bearing is seated on this auxiliary hub.

However, the shaft on which the inner coupling support element can be seated can also be an input shaft of a rope drum. In both aforementioned cases, the inner coupling support element is seated on one of these shaft types. Alternatively, it is also possible that the inner coupling support element is the shaft itself, so that the internal part of the gearing and the internal part of the bearing are either integral part of or seated on the shaft.

Instead of being an input hub of a rope drum, e.g. in the form of an end flange of the rope drum, the above-mentioned base hub can also be an output hub of a gear box. In both aforementioned cases, the outer coupling support element is seated in one of these hub types. However, it is also possible that the outer coupling support element is the base hub itself, so that the external part of the gearing and the external part of the bearing are either integral part of or seated in the base hub.

Other configurations of the inner and outer coupling support element are possible, thus any other machine element suitable for rotational movement.

Preferably, the bearing is configured as a spherical sleeve bearing, wherein the spherical sleeve bearing forms a certain spherical radius, in order to allow a swiveling of the inner coupling support element and/or outer coupling support element from the mutual axis of rotation.

Abstractly, the spherical sleeve bearing represents a notional ball (internal part) seated in a notional bowl (external part) and therefore is able to transmit radial as well as axial forces. The movement of the ball inside the bowl is only constrained by the construction it is built in. The radius can be adjusted so that the construction allows the desired swiveling angle necessary for the individual lifting device application. With the spherical bearing, it is advantageously achieved in comparison with the above-described prior art that a line contact is maintained between the internal and the external part of the bearing instead of a point contact.

The spherical bearing can be made of e.g. GGG 70, PU, Bronze or SAE 52100. The touching surfaces of the internal and the external part of the bearing are preferably treated, in particular coated, with gliding material. Alternatively and/or additionally, suitable lubricants can be used.

The application of other embodiments of the bearing are also possible.

According to another aspect of the invention provision may be made that each one of the internal and external part of the bearing, in particular spherical sleeve bearing, is divided into two parts, in particular two halves in terms of technical function, in particular two geometrical halves, each part located on one side of the gearing in direction of the mutual axis of rotation and each configured to cope with the radial force(s) as well as one direction of the axial force(s).

In other words, the bearing is split at its center line, which is arranged orthogonally to the mutual axis of rotation and orthogonally to the axis of swiveling, into two parts. Each of the two parts comprises an internal and external part and is seated in such a way that the two parts are belting the gearing on each side of the center line.

Halves in terms of technical function means that the radial forces are equally separated and transmitted via each of the halves.

In a preferred embodiment, the spherical sleeve bearing is divided into two geometrical halves. This configuration allows the utmost swiveling as the axis of swiveling is intersecting or close to the geometrical center line of the bearing. Furthermore, this configuration facilitates the assembling of the coupling.

It may be advantageously provided that the external part of the bearing, rotational wise and/or in direction of the axis of rotation, is fixed by friction fit and/or form fit to the outer coupling support element.

There are basically four different possible embodiments, namely
1. a fixation rotational wise and in direction of the axis of rotation by friction fit,
2. a fixation rotational wise and in direction of the axis of rotation by form fit,
3. a fixation rotational wise by form fit and in direction of the axis of rotation by friction fit, or
4. a fixation rotational wise by friction fit and in direction of the axis of rotation by form fit.

The fourth embodiment is very suitable, as it can advantageously cope with axial forces due to the form fit, can cope with radial forces as it is seated in the outer coupling support element, and does not necessarily need form fit rotational wise, since the rotation and torque is transmitted via the gearing.

In addition, provision may be made that the internal part of the bearing, rotational wise and/or in direction of the axis of rotation, is fixed by friction fit and/or form fit to the inner coupling support element.

Analogous to the external part of the bearing, there are the same four possible embodiments for the fixation of the internal parts. In the preferred fourth embodiment the fixation rotational wise is done by friction fit and in direction of the axis of rotation by form fit. The benefit stated in consideration of the external part of bearing apply also for the internal part of bearing.

In accordance with the invention it is also suggested that the external part of the bearing is wider than the internal part of the bearing, in direction of the axis of rotation. This advantageously assures contact of the internal part of the bearing and the external part of the bearing during swiveling, as the internal part is able to move between the end faces of the external part.

In a structurally simple manner, the gearing comprises a spur gear. However, other types of gearing are possible. Preferably, the internal part of the gearing forms a crowning radius at its teeth, which is smaller than the spherical radius at the spherical sleeve bearing. By this the needed degree of freedom at the bearing is gained.

It may be advantageously provided that the external part of the gearing is wider than the internal part of the gearing, in direction of the axis of rotation. This assures contact of the internal part of the gearing and the external part of the gearing during swiveling, as the internal part is able to move between the end faces of the external part while still meshing.

In a structurally simple manner, the internal part of the gearing is machined into the inner coupling support element and/or the external part of the gearing is machined into the outer coupling support element. Hereby, the number of parts needed for the construction of the coupling can be advantageously further reduced respectively.

Also a lifting device, in particular a hoist or a rope hoist that can be used alone or for a crane mounted on a movable crane trolley, having a gear box, a rope drum and a coupling connecting the gear box and the rope drum, wherein the coupling is configured according to the invention, leads to the above-mentioned advantages and can therefore be designed in a more robust and still compact way. Such a lifting device is motorized in that a drive motor, preferably an electric motor, is drivingly connected to the gear box of the lifting device.

The aforementioned and further objects, advantages, purposes, and features of the present invention will become apparent upon review of the following specification in conjunction with the drawings.

DETAILED DESCRIPTION OF THE INVENTION

Figure 1:
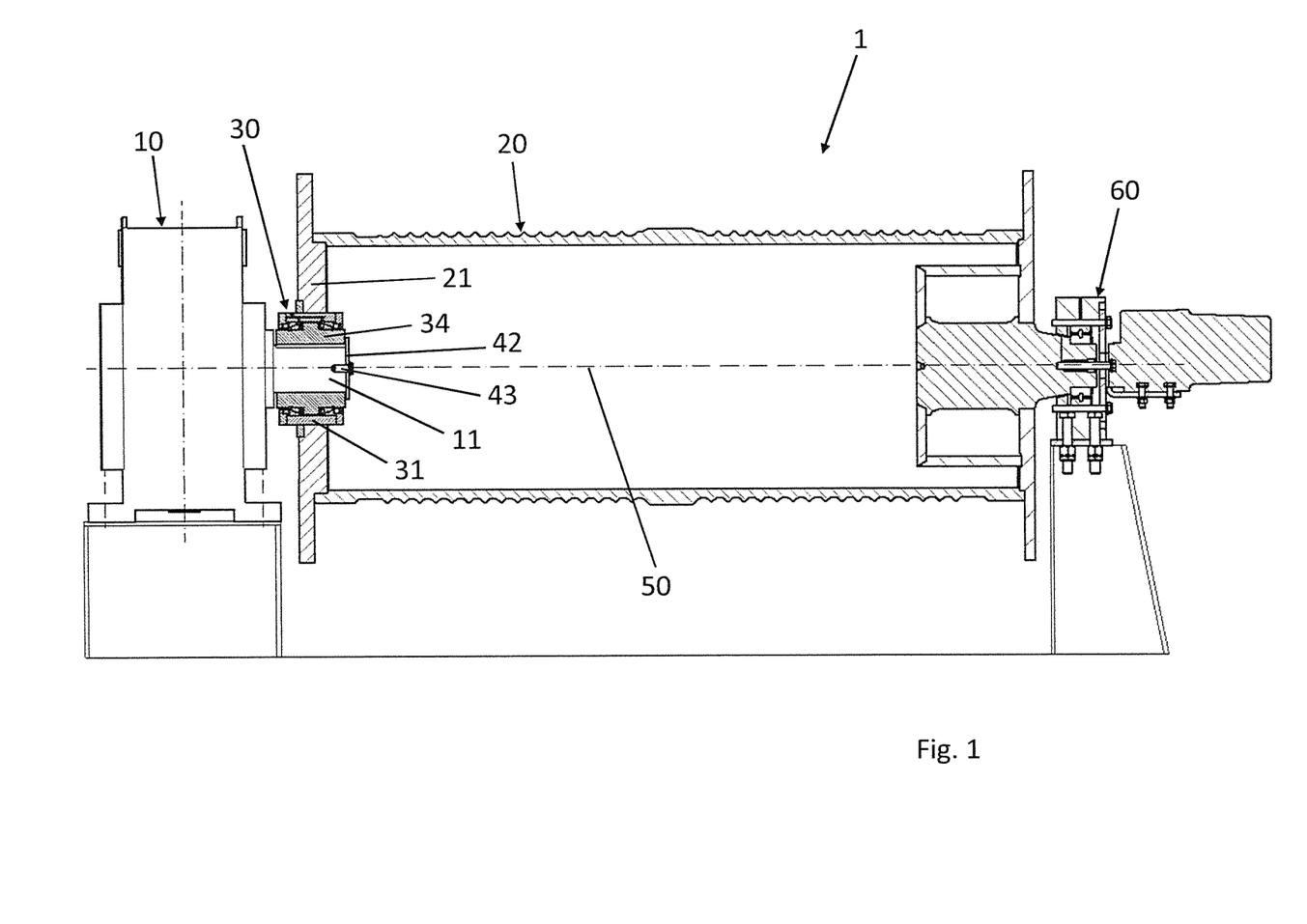
FIG. 1 shows a cross section of a lifting device having a gear box, a rope drum, and a coupling.

FIG. 1 shows a cross section of a motorized lifting device 1 having a drive motor (not shown), a gear box 10 connected to the drive motor, a rope drum 20 for holding, guiding, winding and unwinding a rope (not shown), and a coupling 30 according to the invention. The lifting device is designed as a hoist, in particular a rope hoist (rope not shown) that can be used alone or for a crane mounted on a movable crane trolley.

At one of its longitudinal ends the rope drum 20 is connected to the gear box 10 via the coupling 30. At the opposite longitudinal end, the rope drum 20 is connected to a support 60 of the lifting device 1, allowing rotation of the rope drum 20 with respect to its axis of rotation extending lengthwise. The axis of rotation of the rope drum 20 corresponds to an axis of rotation 52 (see FIGS. 3a and 3b) of an outer coupling support element 31 of the coupling 30. By motorized rotation of the rope drum 20 the rope can be wound and unwound from the rope drum 20 in order to lift and lower a load handling device, e.g. a load hook, that is attached at the end of the rope freely hanging down from the rope drum 20.

The rope drum 20 comprises a base hub 21, which is configured as an input hub, designed as an end flange and arranged at the longitudinal end facing the gear box 10 and another end flange arranged at the opposite longitudinal end facing the support 60. Both plate-shaped end flanges delimit the rope drum 20.

The gear box 10 comprises a casing and a shaft 11, which is configured as an output shaft and to output rotation and torque that is induced by the drive motor of the lifting device 1.

The coupling 30 comprises an inner coupling support element 34 and the outer coupling support element 31, wherein the inner coupling support element 34 and the outer coupling support element 31 are configured to rotate around their mutual axis of rotation 50. The coupling 30 is configured to allow a swiveling of the inner coupling support element 34 and/or the outer coupling support element 31 from the mutual axis of rotation 50. In FIG. 1 the above-mentioned axis of rotation of the rope drum 20 coincides with the mutual axis of rotation 50.

The coupling 30 also comprises a gearing 32; 33 and a bearing 36; 37 (see FIG. 2 to FIG. 3b), so that it can transmit rotation and torque from the gear box 10 to the rope drum 20 and to transmit radial and axial forces from the rope drum 20 to the gear box 10. Both the gearing 32; 33 and the bearing 36; 37 each comprises an external 32; 37 and an internal part 33; 36.

The outer coupling support element 31 is configured as an auxiliary hub, which is seated in the base hub 21 formed by the end flange of the rope drum 20, and is connected to the base hub 21 of the rope drum 20, e.g. by means of bolts (not shown). Furthermore, the inner coupling support element 34 is configured as an auxiliary hub, which is seated on the shaft 11, and is connected to the shaft 11 of the gear box 10 by means of form fit and is secured by a retaining plate 42 which is bolted to the shaft by means of a locking screw 43. Other means for securing the inner coupling support element 34 are also possible.

Other configurations of the inner and outer coupling support elements 34, 31 are possible, thus any other machine element suitable for rotational movement. It is also possible that the inner coupling support element 34 is the shaft 11 itself, so that the internal part of the gearing 33 and the internal part of the bearing 36 are either integral part of or seated on the shaft 11. Furthermore, it is possible that the outer coupling support element 31 is formed by the base hub 21 or respective end flange of the rope drum 20 itself, so that the external part of the gearing 32 and the external part of the bearing 37 are either integral part of or seated in the base hub 21.

Figure 2:
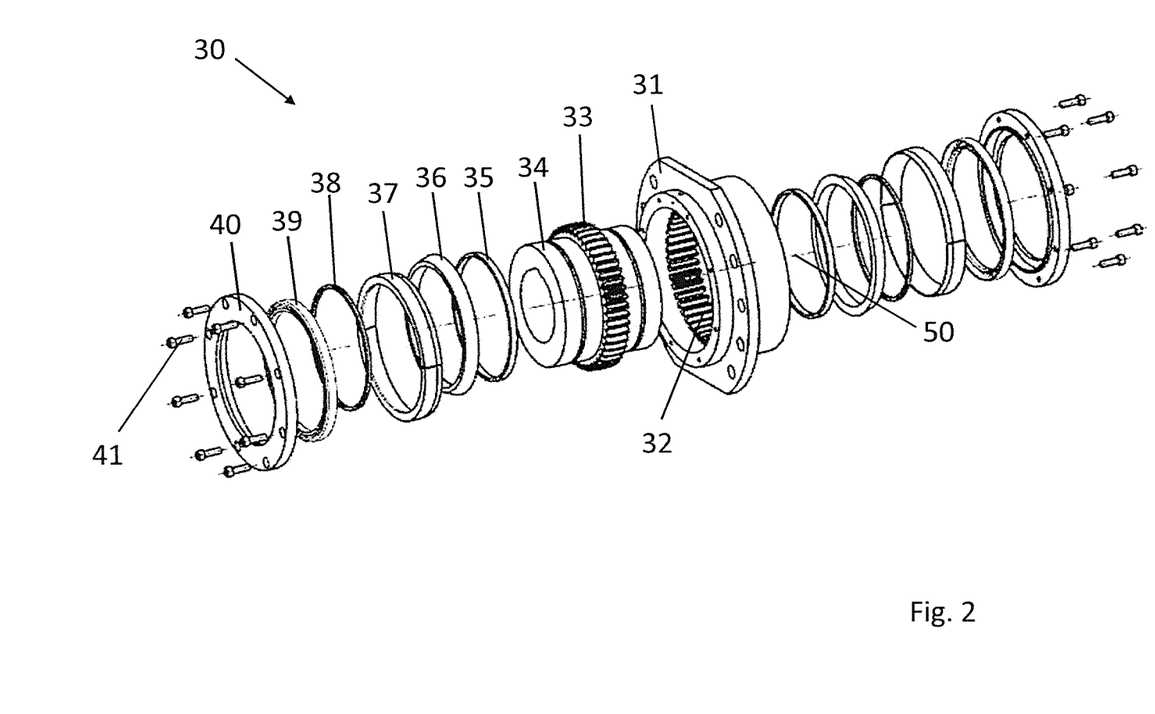
FIG. 2 shows an exploded view of the coupling.

FIG. 2 shows an exploded view of the coupling 30. In this view the substantial structural elements of the coupling 30 are shown separately and twice, with exception for the inner and outer coupling support element 31; 34 and the internal and external part of gearing 32; 33, as the arrangement of the elements shown twice is symmetrical.

The bearing 36; 37 of the illustrated embodiment is configured as a spherical sleeve bearing, wherein the spherical sleeve bearing forms a certain spherical radius, in order to allow a swiveling of the inner coupling support element 34 and/or outer coupling support element 31 from the mutual axis of rotation 50.

Each part of the spherical sleeve bearing, internal 36 and external 37, is divided into two geometrical halves at its center line 53, which is arranged orthogonally to the mutual axis of rotation 50 and orthogonally to the axis of swiveling. Each half comprising an internal 36 and external 37 part is located on one side of the gearing 32; 33 in direction of the mutual axis of rotation 50 and each configured to cope with the radial force(s) as well as one direction of the axial force(s).

This configuration allows the utmost swiveling as the axis of swiveling is intersecting or close to the geometrical center line 53. Furthermore, this configuration facilitates the assembling of the coupling 30 for production and repair purposes, as both sides can be mounted individually.

The gearing 32; 33 comprises a spur gear, however, other types of gearing are possible. The internal part of the gearing 32 is machined into the inner coupling support element 34, thus is integral part of it, and the external part of the gearing 33 is machined into the outer coupling support element 31, thus is integral part of it. Hereby, the number of parts needed for the construction of the coupling can be advantageously further reduced. The internal part of the gearing 33 forms a crowning radius at its teeth, which is smaller than the spherical radius at the spherical sleeve bearing 36; 37. By this the needed degree of freedom at the spherical sleeve bearing 36; 37 is gained.

Between the internal part of bearing 36 and the internal part of the gearing 33 a spacer 35 is arranged, in order to maintain space for the swiveling. A retainer ring 38 is used to fix the internal part of bearing 36 in direction of the axis of rotation 50; 51.

The coupling 30 is closed at both sides by means of cover rings 40 which are bolted to the outer coupling support element 31 by means of screws 41. A seal 39 is applied in order to keep a lubricant inside the coupling 30.

Figure 3:
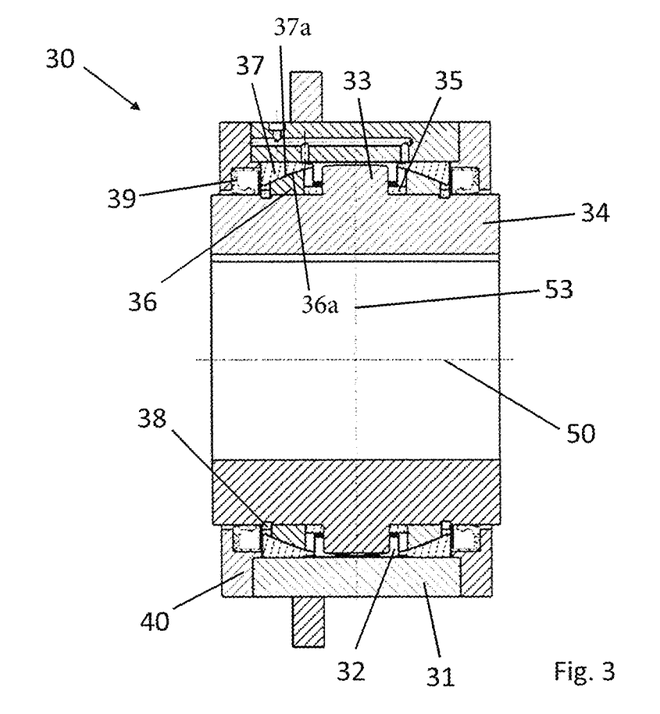
FIG. 3 shows a cross section of the coupling without swiveling.

FIG. 3 shows a cross section of the coupling 30 without swiveling. The axis of rotation 51 (see FIGS. 3a and 3b) of the inner coupling support element 34 and the axis of rotation 52 (see FIGS. 3a and 3b) of the outer coupling support element 31 lie over each other, thus generate the mutual axis of rotation 50 and coincide with the same.

The external part of the bearing 37 is wider than the internal part of the bearing 36, in direction of the axis of rotation 50, 51, 52, with the external part of the bearing 37 having a bearing surface 37a and the internal part of the bearing 36 having a bearing surface 36a. This advantageously assures contact of the internal part of the bearing 36 and the external part of the bearing 37 during swiveling, as the internal part 36 is able to move between the end faces of the external part 37 facing in direction of the axis of rotation 50, 51, 52.

The external part of the bearing 37 is fixed to the outer coupling support element 31 rotational wise by friction fit and in direction of the axis of rotation 50; 52 by form fit. The internal part of the bearing 36 is fixed to the inner coupling support element 34 rotational wise by friction fit and in direction of the axis of rotation 50; 51 by form fit.

Due to the form fit, it can cope with the axial forces and due to the fact that it is seated in the inner and outer coupling support elements 34, 31 it can cope with the occurring radial forces. It does not necessarily need form fit rotational wise, since the rotation and torque is transmitted via the gearing 32; 33.

The external part of the gearing 32 is wider than the internal part of the gearing 33, in direction of the axis of rotation 50, 51, 52. This assures contact of the internal part of the gearing 33 and the external part of the gearing 32 during swiveling, as the internal part 33 is able to move between the end faces of the external part 32 facing in direction of the axis of rotation 50, 51, 52, while still meshing.

The outer coupling support element 31 may also comprise a lubrication system for lubrication of the bearing.

Additionally, the description regarding FIG. 2 applies to FIG. 3 as well.

Figure 3A:
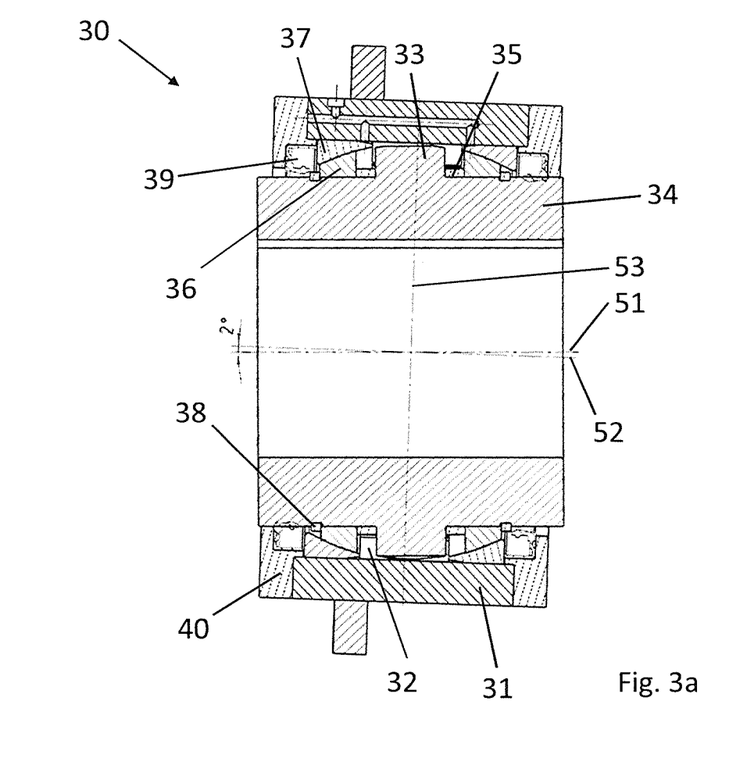
FIG. 3a shows a cross section of the coupling according to FIG. 3 swiveled clockwise.

FIG. 3a shows a cross section of the coupling 30 according to FIG. 3 swiveled clockwise. The axis of rotation 52 of the outer coupling support element 31 is exemplarily swiveled clockwise by 2° regarding the axis of rotation 51 of the inner coupling support element 34. Thus, the rope drum 20 is swiveled correspondingly.

In this configuration, due to the swiveling, the internal part of gearing 33 has moved rotational wise and is now located at an outer side of the external part of gearing 32. Above the axes of rotation 51, 52 the internal part of gearing 33 is located at the outer left side of the external part of gearing 32, whereas below the axes of rotation 51, 52 the internal part of gearing 33 is located at the outer right side of the external part of gearing 32.

Furthermore, the internal part of bearing 36 has moved rotational wise with regard to the external part of bearing 37. Above the axes of rotation 51, 52 and on the left-hand side of the center line 53 the internal part of bearing 36 is now located at the outer left side of the external part of bearing 37. Above the axes of rotation 51, 52 and on the right-hand side of the center line 53 the internal part of bearing 36 is now located at the inner left side of the external part of bearing 37. Below the axes of rotation 51, 52 and on the left-hand side of the center line 53 the internal part of bearing 36 is now located at the inner right side of the external part of bearing 37. Below the axes of rotation 51, 52 and on the right-hand side of the center line 53 the internal part of bearing 36 is now located at the outer right side of the external part of bearing 37.

Additionally, the description regarding FIG. 3 applies to FIG. 3a as well.

Figure 3B:
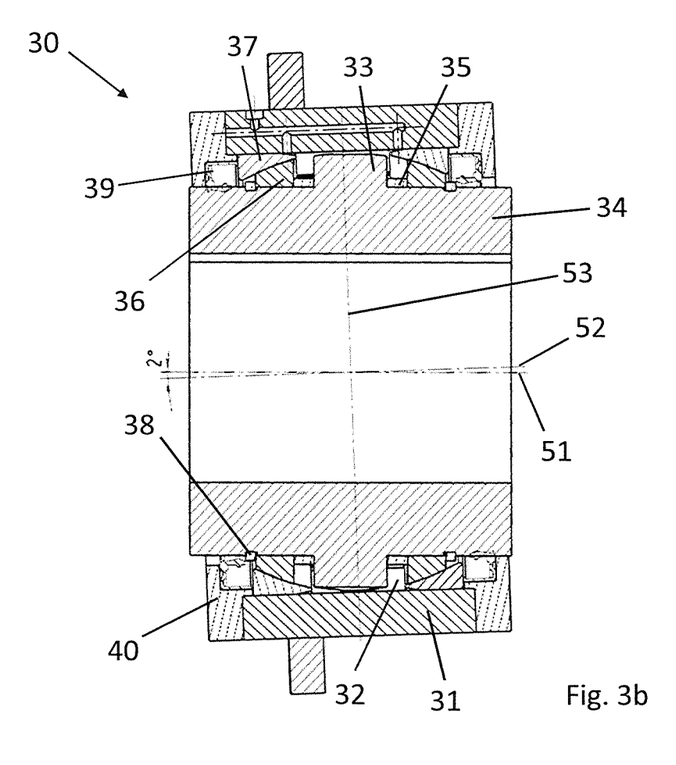
FIG. 3b shows a cross section of the coupling according to FIG. 3 swiveled counter-clockwise.

FIG. 3b shows a cross section of the coupling 30 according to FIG. 3 swiveled counter-clockwise. The axis of rotation 52 of the outer coupling support element 31 is exemplarily swiveled counter-clockwise by 2° regarding the axis of rotation 51 of the inner coupling support element 34. Thus, the rope drum 20 is swiveled correspondingly.

Additionally, the description regarding FIG. 3 and FIG. 3a applies to FIG. 3b as well.

LIST OF REFERENCE NUMERALS

10 Gear box
11 Shaft
20 Rope drum
21 Base hub
30 Coupling
31 Outer coupling support element
32 External part of gearing
33 Internal part of gearing
34 Inner coupling support element
35 Spacer
36 Internal part of bearing
37 External part of bearing
38 Retainer ring
39 Seal
40 Cover ring
41 Screws
42 Retaining plate
43 Locking screw
50 Mutual axis of rotation
51 Axis of rotation of inner coupling support element
52 Axis of rotation of outer coupling support element
53 Center line
60 Support

The invention claimed is:

1. A lifting device having a gear box, a rope drum and a coupling connecting the gear box and the rope drum, wherein the coupling comprises an inner coupling support element and an outer coupling support element, wherein the inner coupling support element and the outer coupling support element are configured to rotate around a mutual axis of rotation, wherein the coupling is configured to allow a swiveling of the inner coupling support element and/or the outer coupling support element from the mutual axis of rotation, wherein the coupling further comprises a gearing and a bearing with the gearing being configured to transmit rotation and torque from the gear box to the rope drum and the bearing being configured to transmit radial and axial forces from the rope drum to the gear box, wherein both the gearing and the bearing each comprise an external part and an internal part, wherein:
   the external part of the gearing is an integral part of the outer coupling support element or seated in the outer coupling support element;
   the external part of the bearing is an integral part of the outer coupling support element or seated in the outer coupling support element;
   the internal part of the gearing is an integral part of the inner coupling support element or seated on the inner coupling support element;
   the internal part of the bearing is an integral part of the inner coupling support element or seated on the inner coupling support element; and
   wherein the external part of the bearing defines an external bearing surface and the internal part of the bearing defines an internal bearing surface with the internal bearing surface directly contacting the external bearing surface, and wherein the external bearing surface is axially wider than the internal bearing surface.

2. The lifting device as recited in claim 1, wherein the inner coupling support element is configured as an auxiliary hub and/or the outer coupling support element is configured as an auxiliary hub.

3. The lifting device as recited in claim 2, wherein the inner coupling support element configured as an auxiliary hub is formed to be seated on a shaft.

4. The lifting device as recited in claim 2, wherein the outer coupling support element configured as an auxiliary hub is formed to be seated in a base hub.

5. The lifting device as recited in claim 4, wherein the base hub is designed as an end flange of the rope drum.

6. The lifting device as recited in claim 1, wherein the bearing is configured as a spherical sleeve bearing, wherein the spherical sleeve bearing forms a certain spherical radius, in order to allow a swiveling of the inner coupling support element and/or the outer coupling support element from the mutual axis of rotation.

7. The lifting device as recited in claim 6, wherein the internal part of the gearing forms a crowning radius at its teeth, which is smaller than the spherical radius at the spherical sleeve bearing.

8. The lifting device as recited in claim 1, wherein each one of the internal part and the external part of the bearing is divided into two parts, with each part located on one side of the gearing in direction of the mutual axis of rotation, wherein the external bearing surface comprises a pair of external bearing surfaces located on either side of the gearing and wherein the internal bearing surface comprises a pair of internal bearing surfaces located on either side of the gearing, wherein each internal bearing surface directly contacts a respective one of the external bearing surfaces, and wherein each external bearing surface is axially wider than the respective internal bearing surface with which it is in contact.

9. The lifting device as recited in claim 8, wherein each one of the internal part and the external part of the bearing is divided into two halves in terms of technical function, with each part configured to cope with the radial force(s) as well as one direction of the axial force(s).

10. The lifting device as recited in claim 9, wherein each one of the internal part and the external part of the bearing is divided into two geometrical halves.

11. The lifting device as recited in claim 1, wherein the external part of the bearing, rotational wise and/or in direction of the axis of rotation, is fixed by friction fit and/or form fit to the outer coupling support element.

12. The lifting device as recited in claim 1, wherein the internal part of the bearing, rotational wise and/or in direction of the axis of rotation, is fixed by friction fit and/or form fit to the inner coupling support element.

13. The lifting device as recited in claim 1, wherein the external part of the gearing is wider than the internal part of the gearing.

14. The lifting device as recited in claim 1, wherein the internal part of the gearing is machined into the inner coupling support element.

15. The lifting device as recited in claim 1, wherein the external part of the gearing is machined into the outer coupling support element.

16. The lifting device as recited in claim 1, wherein when the inner coupling support element and the outer coupling support element are aligned about the mutual axis of rotation the external bearing surface extends beyond the width of the internal bearing surface in both directions along the mutual axis of rotation.

17. The lifting device as recited in claim 16, wherein the external bearing surface comprises a pair of external bearing surfaces located on either side of the gearing and wherein the internal bearing surface comprises a pair of internal bearing surfaces located on either side of the gearing, wherein each internal bearing surface directly contacts a respective one of the external bearing surfaces, and wherein each external bearing surface is axially wider than the respective internal bearing surface with which it is in contact with the each external bearing surface extending beyond the width of the respective internal bearing surface with which it is in contact in both directions along the mutual axis of rotation.

* * * * *